Figure 1:
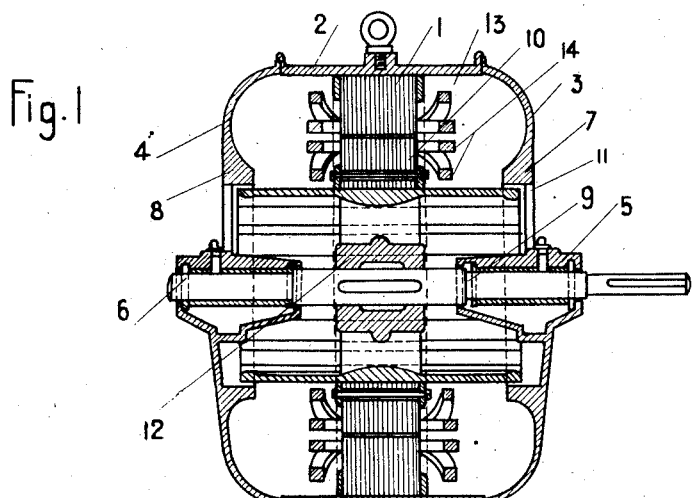

Jan. 11, 1927. 1,614,008
V. MARTINETTO
ASYNCHRONOUS INDUCTION ELECTRIC MACHINE
Filed April 25, 1922   3 Sheets-Sheet 1

Inventor
Vittorio Martinetto
By E.F.W. Brandenburg
Attorney

Jan. 11, 1927. 1,614,008
V. MARTINETTO
ASYNCHRONOUS INDUCTION ELECTRIC MACHINE
Filed April 25, 1922   3 Sheets-Sheet 2
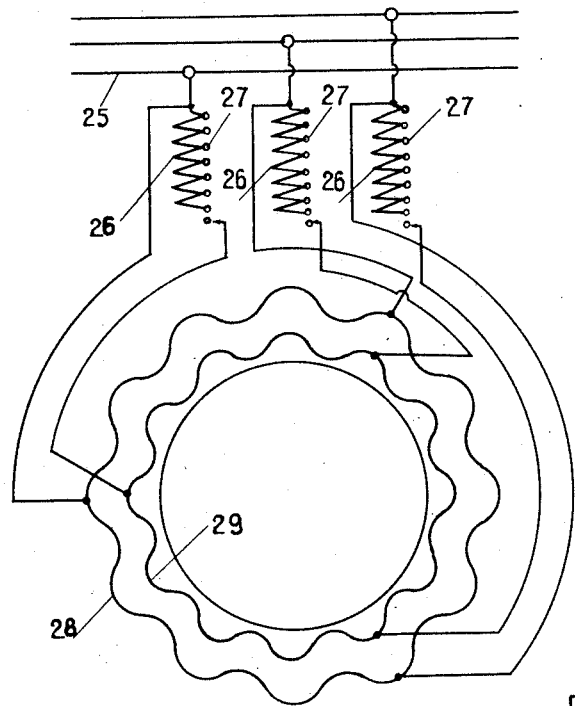
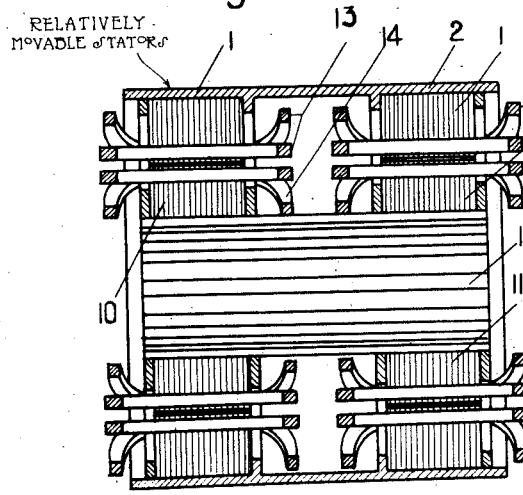
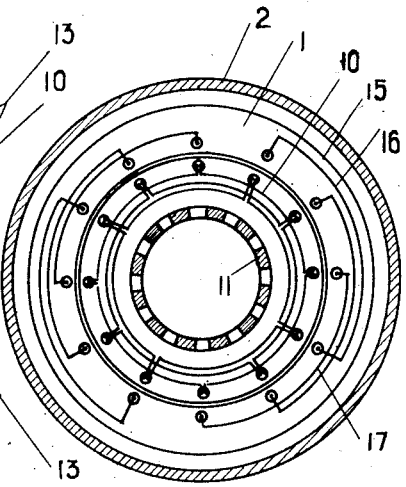
Inventor
Vittorio Martinetto

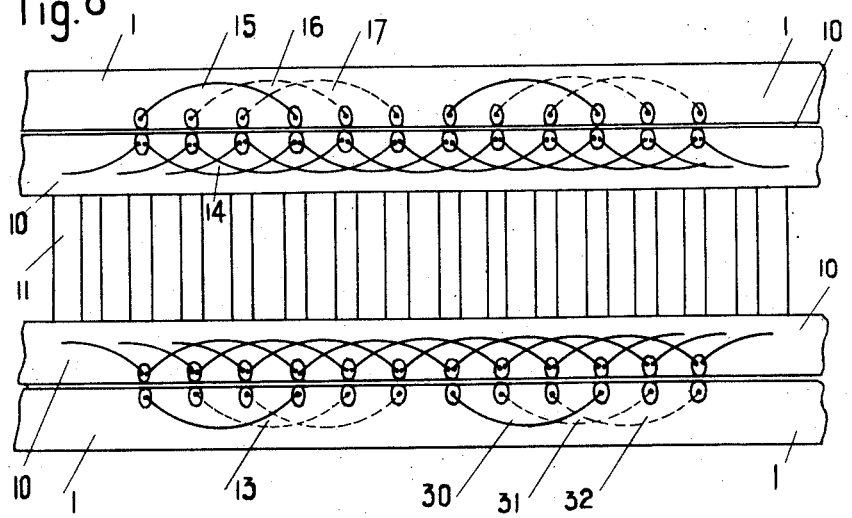
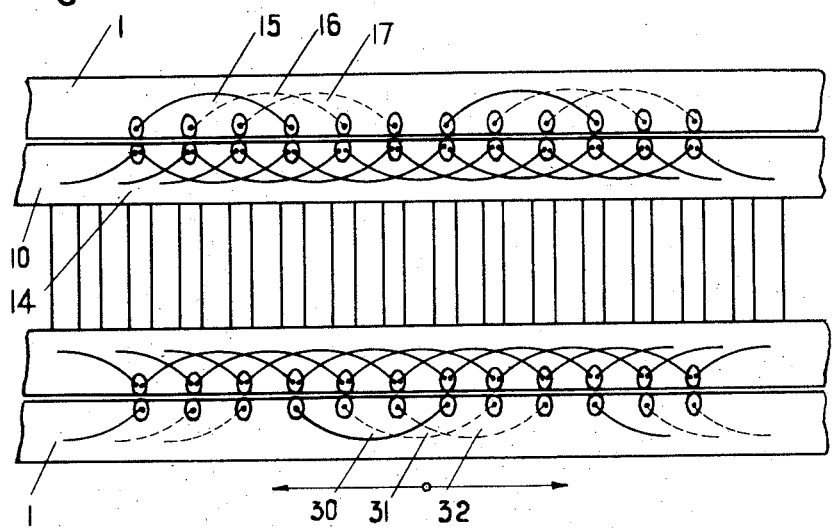

Patented Jan. 11, 1927.

1,614,008

UNITED STATES PATENT OFFICE.

VITTORIO MARTINETTO, OF TURIN, ITALY.

ASYNCHRONOUS INDUCTION ELECTRIC MACHINE.

Application filed April 25, 1922, Serial No. 556,448, and in Italy July 2, 1921.

This invention relates to asynchronous induction motors and generators and its objects are: the economic regulation of speed, the starting with a good torque without inserting ohmic resistances in the secondary circuit, the improvement of the power-factor and therefore the possibility of constructing induction motors with a large air-gap.

In polyphase motors, while the field in the air gap is a rotating one and its value is practically constant, that set up by the frontal or end connections can be made practically fixed in space by overlapping the frontal connections of the different primary phases in such a manner as to generate in some predetermined positions a common polar axis. Therefore the primary and secondary transverse fields are made relatively asymmetrical by this arrangement which is utilized to realize the purposes indicated above.

According to the present invention, the magnetic circuit of the primary and secondary frontal connections is partially or totally closed, and the want of equilibrium resulting between the primary and the secondary circuits is increased by so overlapping the frontal connections of the different primary phases as to generate in some predetermined position a common polar axis; the secondary frontal connections being disposed in the most symmetrical manner. By this arrangement the unbalanced transverse field generated by the primary and secondary frontal connections, is due in a large part at some points to the secondary frontal connections, while at some other points tne primary field is counterbalanced by a secondary one whose value is about one half that of the primary.

It is clear therefore that the improved characteristics of the machine result from the fact that the transverse fields produced by the end connections of the primary and secondary windings do not balance each other in all portions of the circumference of the motor. If the fields were of corresponding strength in all portions of the circumference, as would be the case with the ordinary motor in which the end connections of both windings are similarly arranged, the fields might be described as similar or relatively symmetrical. Therefore, in a motor embodying my invention, in which the primary and secondary transverse fields do not balance each other at all points, the fields may be described as relatively asymmetrical. Heretofore such an arrangement of the end connections has been avoided because it was considered disadvantageous, and the advantage of its use where the end connections of both windings were closely inductively related was not recognized.

The aforesaid want of equilibrium or symmetry generates in the primary and secondary windings a reactive E. M. F. which increases the resulting impedance of all windings or the equivalent impedance of the machine with the result that the value of the starting current taken from the line is less than that required by the ordinary machine.

The value of the reactive electromotive force in the secondary decreases with the frequency of the current circulating therein, i. e. with the increase of the speed.

The value of the starting current will be in inverse proportion to the sum of the reactive electromotive forces induced in the primary and secondary windings and can be altered, if desired by modifying the equilibrium or value of the primary and secondary transverse magnetic fields to which the reactive E. M. F.'s are due.

The effect of the reactive electromotive forces induced in the primary and secondary windings as aforesaid, diminishes, as in the common induction motors, the torque generated by the rotating field; but in this new motor another more important torque is added to the former, owing to the reaction of the transverse magnetic field generated by the primary and secondary frontal connections over the portions of sections of the primary and secondary windings which are parallel to the shaft of the machine.

From the aforesaid it clearly follows that, as the transverse fields set up by the primary and secondary frontal connections limit the value of the starting current and increase at the same time the starting torque, the effect so attained is the same as that obtained by inserting ohmic resistances in the circuits of an ordinary induction motor. Therefore, by varying in any manner either the value or the equilibrium or the phase of this transverse field, there will result a variation of the speed for which the torque is maximum, thus realizing an economical and gradual regulation of speed as claimed.

The value, the equilibrium and the phase of the transverse fields set up by the primary and secondary frontal connections, and thereby the torque and speed, can be thus modified by either varying by mechanical means the reluctance of the transverse magnetic circuit, or by electrically varying its value and phase by another primary or secondary field whose direction be equal and opposite to the former and produced by means of auxiliary windings, or by augmenting or diminishing the number of coils in the secondary, or by varying the number of turns, or by inserting inductive resistances in the secondary, or else by modifying the interlinking of the primary and secondary windings. When it is preferred not to modify the motor winding characteristics, the torque and speed under a given load will be modified by varying the voltage supplied.

When this machine is working as an asynchronous induction generator, the counter E. M. F. will increase and become preponderating, with the result that the generator will be able to work with a power factor equal to or larger than unity.

The construction and principles above disclosed can be applied as much to polyphase motors as to single-phase ones supplied with phase splitting devices for starting. They can also be applied to motors with any number of poles, and to motors in which the main speed is regulated by varying the number of poles limiting but the utilization of the principle of this invention to the advantage obtained relative to the starting and to the intermediate regulation of speed.

The power-factor at full load being very high, it will be possible in these motors to have a larger air gap than that usually provided.

The described principles of my invention and the way of practically realizing them, are illustrated in the annexed drawings, showing diagrammatically two embodiments of the motor or generator, according to the present invention, and showing the diagrams of the connections relating thereto. The word motor is generally used hereinafter also to designate a generator, it being understood that any polyphase or single-phase asynchronous induction motor becomes a generator when rotating at a higher speed than the synchronous speed.

Fig. 1, diagrammatically shows the axial section of a polyphase induction motor, in which both the end shields are utilized in connection with the frame, to close the magnetic circuit of the frontal connections.

Figure 2:
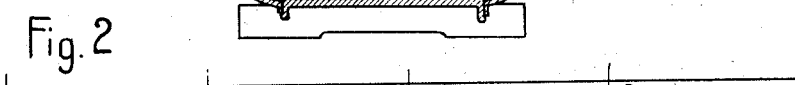

Fig. 2, shows the primary and secondary core of the motor shown in Fig. 1, developed in a plane, with the arrangement of the frontal connections of the primary three-phase winding and with a secondary winding composed of four elementary coils symmetrically disposed, connected in series and closed in short circuit.

Figure 3:
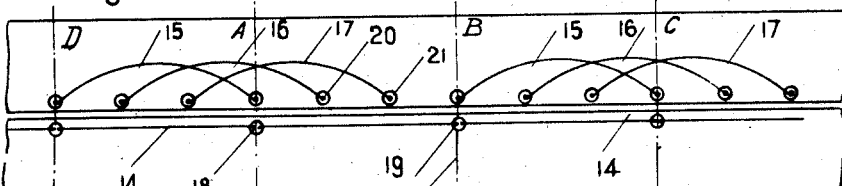

Fig. 3, differs from Fig. 2 in the number of the secondary windings. In Fig. 3, I have shown three distinct secondary windings, each being composed of four coils connected in series and closed in short circuit. Each winding is electrically independent from the others.

Figure 4:
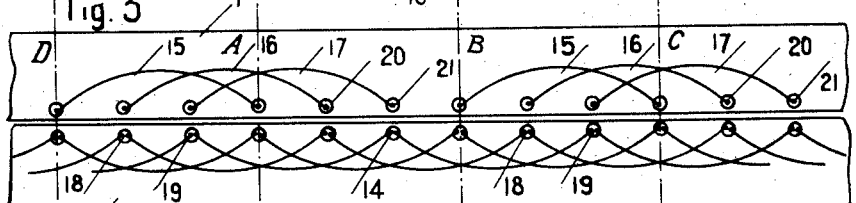

Fig. 4 shows, like Fig. 2 and Fig. 3, the primary and secondary windings developed in a plane, but it differs from the former figures in that the stator is provided with two distinct windings, respectively drawn with a full line and a dotted line, and the frontal connections of these windings are identical but displaced 180° electrical degrees from one another. The two windings are independently supplied with variable voltages, for the purpose of gradually diminishing the want of equilibrium of the magnetic field generated by the frontal connections and of varying therewith the value of the primary and secondary fields, thus varying the torque, the speed and the power factor of the motor.

Fig. 5 diagrammatically shows the connections of the two windings of the stator shown in Fig. 4, and the connections of a variable voltage transformer to modify the value of one of the primary transverse fields and indirectly the secondary one and thereby the torque, the speed and the power factor of the motor.

Figs. 6 and 7, show the axial and transverse sections of a polyphase motor embodying the present invention, with two stators and two rotors put together on the same frame and shaft. The magnetic circuit is closed in the transverse sense only for the primary and secondary frontal connections contained between the two cores. Fig. 7 clearly shows the arrangement of the primary and secondary frontal connections in a three-phase motor having four poles, these connections being identical also for the motor shown in Fig. 1.

Fig. 8 diagrammatically shows the motor of Figs. 6 and 7, developed in a plane, indicating the relative positions of the primary and secondary frontal connections of the two cores.

Fig. 9 shows, like Fig. 8, the motor of Figs. 6 and 7 developed in a plane. One of the stator cores in this modification can rotate through a certain angle thus varying the relative positions of the frontal connections on one core in comparison with those of the other, for the purpose of varying, by this displacement, the value of the secondary transverse field from its maximum value down to zero value and thereby the torque the speed and the power factor.

Figure 10:
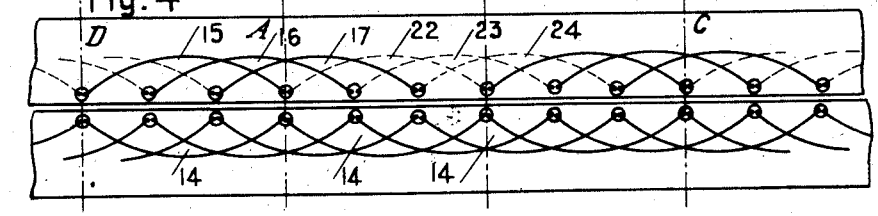

Fig. 10 is a plan view of the secondary winding of Fig. 2 developed in a plane.

The same reference characters refer to the same parts in the different figures.

In Fig. 1, I have shown at 1 the stator core fixed to the stator frame 2 of magnetic material; to this are fixed in the usual way the end shields 3 and 4 of magnetic material which hold the bearings 5 and 6. The shields are provided with internally projecting circular flanges 7 and 8. The shaft 9, rotating in the bearings 5 and 6, bears the armature-hub 12 which in connection with the cylinder 11 holds the secondary core 10. In the cylinder 11 there are slits made parallel to the shaft, and the cylinder itself is sufficiently long to rotate in front of the flange-shaped edges 7 and 8 of the hoods. The primary core 1 is provided at its inner circumferential side with slots wherein the primary winding 13 is arranged; the rotor-core 10 is provided at its external circumferential side with slots wherein is placed the secondary winding 14. The primary and secondary cores 1 and 10, the frame 2, the end shields 3 and 4 with their flanges 7 and 8, and the cylinder 11, are all formed of magnetic material and are used to close in the transverse sense the magnetic circuit for the field set up by the frontal connections of the primary and secondary windings.

In Figs. 2 and 3, is shown at 1 the primary core, with 10 the secondary one, at 15, 16 and 17 the frontal connections of a three phase four-pole primary winding; at 18 and 19 the portions of the secondary winding parallel to the machine shaft; at 20 and 21 the portions of the primary winding parallel to the shaft. At 14 is shown the secondary frontal connections symmetrically arranged and connected in series with each other, the whole winding 14 being closed in short circuit. The primary frontal connections 15—16—17 instead of being disposed symmetrically are all turned in one direction, so as to generate in the transverse sense an unbalanced field, since they set up two fields displaced through 180° (space degrees) while the secondary winding sets up four fields displaced through 90°. In other words the primary frontal connections 15—16—17 are so overlapping as to generate a polar axis common to the three windings.

Referring now to Figs. 2 and 3 and assuming, for sake of simplicity, that only the primary winding 15 is supplied with current, I explain the operation of this motor as follows: The magnetic fields set up by the portions of the primary winding 15 parallel to the shaft and by the end connections of the primary winding induce in the corresponding secondary winding 14 E. M. F. which causes a current to circulate therein.

Although the secondary ampere-turns wholly counterbalance the primary field in the air gap, owing to the relative arrangement of the end connections, the primary transverse field produced by the end connections will be opposed only by a secondary magneto-motive force generated by a number of secondary ampere-turns having about half the value of the corresponding primary ampere-turns as the other half of secondary turns are not in close inductive relation to the primary winding and the field generated thereby does not react upon the primary field.

The unbalanced transverse magnetic field generated in the portions between D and A, B and C, will be due to one half the primary ampere-turns; while in the portions between A and B, C and D the transverse field is due to all the secondary ampere-turns in these portions.

The magneto-motive forces to which these magnetic fields are due are so great that the fields will have considerable value even if the reluctance of the transverse magnetic circuit be relatively large.

The operation and the special characteristics of this motor depend upon these unbalanced transverse fields.

Having explained how these unbalanced fields are generated, I will explain how the characteristics of the motor can be influenced by the transverse magnetic fields, so that the characteristics of this motor substantially differ from the ordinary induction motor.

As the transverse magnetic field interlinking both primary and secondary windings has a relatively large value, the E. M. F. induced is also large. This E. M. F. by the "Lenz law" must tend to set up a current of such value and direction as to eliminate the lack of symmetry of the transverse field. The E. M. F. induced in the secondary winding will, therefore, increase the secondary current; the secondary ampere-turns are thus increased and at the same time an unbalanced field of like value is generated in the air gap of the motor. In other words, by increasing the secondary current in order to balance the transverse field, the secondary ampere-turns in the air-gap become preponderating over the primary ones.

As the increase of the secondary current depends upon the value and the lack of symmetry of the transverse fields, it is possible to vary the phase and value of the field in the air-gap by modifying the unbalancing of the transverse field.

As the magnitude of the secondary ampere-turns in the air-gap may be greater than the corresponding primary ampere-turns, the resulting field cannot transfer energy from the primary to the secondary winding. Therefore, only the transverse field common to both primary and secondary windings can transfer energy to the secondary winding.

Furthermore, as the primary transverse field is interlinked with only half the secondary turns, the secondary working E. M. F. induced in that winding will have half value of the E. M. F. induced in the secondary of an ordinary induction motor. Therefore, the short-circuited or locked-rotor current in the new motor will be half that induced in the corresponding ordinary motor. Since the locked-rotor E. M. F. in this motor is reduced as set forth, it is possible to obtain by this rotor the same starting torque per ampere input by inserting only half the secondary resistance required by an ordinary motor or, in other words, if the same secondary resistance is used, the starting torque of the new motor will be twice the starting torque of an ordinary motor.

The value of the transverse field is proportional to the current. Therefore its value and effect upon the characteristics of the motor vary with the load and are reduced to a minimum at no load while the effect is maximum under the locked-rotor condition.

By correctly proportioning the values of the different fields, a motor wound as described in this specification is compensated for the effect of the magnetic leakage of the motor, and thus the power factor is improved. At starting, the power factor of this motor will be at least as great as that of an ordinary motor started by means of ohmic resistance inserted on the secondary winding.

As the tranverse unbalanced fields created in the above-disclosed manner will limit the working secondary E. M. F. and therefore the current absorbed at start, while the same fields cooperate to produce the starting torque and to improve the power factor, it will be possible to vary the starting current, torque and power factor by modifying in any suitable manner the values of these transverse magnetic fields.

A system for varying the speed is shown in Fig. 4, where the primary winding is divided into two distinct portions; the frontal connections of one portion of the winding are turned in one direction, while the connections of the other portion of winding are turned in the opposite direction, so that when supplying the two portions of winding with equal voltages the want of equilibrium between the primary and secondary transverse magnetic fields will be eliminated; when exciting one portion of the primary winding portions with a variable voltage, the want of equilibrium between the primary and secondary magnetic fields will be gradually modified, and thereby the regulation of speed will be obtained.

Fig. 5 shows schematically one of the arrangements for supplying the two windings of Fig. 4. In Fig. 5 25 denotes a source of three-phase electric power supplying both the motor windings through a variable ratio transformer 26. 28 denotes, for instance, the whole of the windings 15—16—17, and 29 the whole of the windings 22—23—24. The transformer 26 is provided with taps 27, to which one of the motor windings shall be connected, while the other is supplied with constant E. M. F. directly from the line 25. By a little variation of the E. M. F. a very strong variation of the absorbed current may be obtained and thereby a very large regulation of speed. The same result can be obtained with an induction-regulator, the phase-displacement produced by the latter having a very little influence.

In the type of motor above described, I have utilized the end-shields and the frame to close the magnetic circuit of the transverse connections; since these parts are in practice massive, there will be generated eddy currents which will heat the end shields and the frame and therefore decrease the efficiency of the motor. I prefer to use this arrangement only for realizing a good starting torque with small current and without starting resistances.

This arrangement is adapted to be preferably used in starting or in small speed alterations, as in the first case there will be strong transverse fields during a short period, whilst in the latter one weak field during the whole operation, therefore the loss due to eddy currents will be kept within practical limits.

On the contrary, to utilize this system for the regulation of the speed, the transverse magnetic fields need to be fully closed through laminated magnetic material, or at least it will be necessary to reduce in length the non-laminated portion of the magnetic circuit of the stator. To accomplish these purposes it will be preferable, though not necessary, to use the arrangement shown in Figs. 6—7—8.

In Figs. 6—7—8, 1 denotes the two laminated primary cores fixed to the frame 2; the cores 1 are provided at their internal cylindrical surface with slots in which the primary winding 13 is wound. 10 denotes the secondary laminated cores provided at their external periphery with slots for the secondary winding 14; these secondary cores are fitted on a cylinder 11, shown in axial sectional elevation in Fig. 6. The transverse magnetic field is closed only as regard to the frontal connections comprised between the two laminated cores, and the closure is effected through the four primary and secondary laminated cores, the frame 2 and the cylinder 11. For sake of simplicity the end shields and the shaft were not shown in this figure. This motor operates like that of Fig. 1, the only object of its construction being to shorten the transversal magnetic circuit, to reduce to a minimum the non-laminated portion of the transverse primary magnetic field and to obtain moreover a very easy regulation of the primary and secondary transverse fields, thus giving to this new motor the characteristics of an ordinary one.

As shown in Fig. 8 the primary frontal connections of the two laminated cores are symmetrically disposed so that by supplying them with current having the same direction, the magnetic fields produced by the primary and secondary frontal connections will be added to each other and the want of equilibrium between the primary and secondary transverse fields will increase at a maximum; on the contrary, by exciting one winding with a current having an opposite direction to that circulating in the other, the transverse field generated from the frontal connections is eliminated, thus transforming this motor into one having the characteristics of an ordinary one. By gradually varying by any suitable means the value and direction of the current circulating in one of the primary windings, the value of the transversal field will be gradually modified from a maximum value to a zero value, thus realizing all of the desired values of the transverse field and thereby of the speed.

As stated above the motor of Fig. 9 differs from the preceding type by making one of the laminated stator cores angularly movable and thereby, no electrical connection being modified, the primary frontal connections of one core are capable of being displaced as regard to those of the other, so as to generate transverse fields that will be added with and partially eliminated by each other.

In the type of motor shown in Figs. 6 to 9, the magnetic field set up by the external frontal connections not being controllable like the one generated by the connections comprised between the four laminated cores, it can be totally balanced by connecting a portion of normal primary winding with a portion of wave wound winding.

It will be easily understood that the want of equilibrium between the primary and secondary transverse fields can be varied in many other ways, for example by means of auxiliary windings, or by varying the reluctance of the magnetic circuit. It will moreover be understood that the phase of the rotor current can be modified by varying the interlinking of the several elementary circuits and connecting them in triangle or star or mixed connection, or by varying the interlinking of phases in the primary windings in a core with respect to the other, and so forth; without departing from the fundamental principle of this invention. Likewise, the primary transverse magnetic field can be symmetrically closed all around the circumference and be irregularly distributed without departing thereby from the principles above explained.

Many other variations can be made to the constructions above described, in practically utilizing my invention, without departing from its fundamental principle, this invention is not to be considered as limited only to the constructions described and illustrated by way of example.

What I claim is:

1. An asynchronous induction machine, comprising stator and rotor elements with primary and secondary windings having end connections, and a common magnetic path of comparatively small reluctance for the primary and secondary end connections, said primary and secondary end connections arranged to generate magnetic fields in said magnetic path which are relatively asymmetrical.

2. An asynchronous induction machine, comprising stator and rotor elements with primary and secondary windings having end connections, a common magnetic path of comparatively small reluctance for the primary and secondary end connections, an air gap, said primary and secondary end connections being inductively related and so disposed as to generate magnetic fields in said magnetic path which are relatively asymmetrical, said end connections having a ratio different from the ratio between the turns generating the field in the air gap.

3. An asynchronous induction machine comprising stator and rotor elements with primary and secondary windings thereon, the end connections of said windings being so arranged as to produce an asymmetrical transverse magnetic field, and an additional winding in inductive relation to one of said first windings and arranged to affect said transverse field under predetermined conditions to change the characteristics of the machine.

4. An asynchronous induction machine comprising stator and rotor elements with primary and secondary windings thereon, the end connections of said windings being so arranged as to produce an asymmetrical transverse magnetic field and the turns of the secondary winding being connected in series relation.

5. An asynchronous induction machine comprising stator and rotor elements with primary and secondary windings having end connections arranged to generate transverse magnetic fields which are relatively asymmetrical, and an auxiliary winding arranged to affect the transverse field.

6. An asynchronous induction machine comprising stator and rotor elements with a primary winding and a secondary winding thereon, the end connections of said windings being so arranged as to produce an asymmetrical transverse magnetic field, and an additional primary winding with the polar axis of the field produced by its end connections displaced relatively to that of the first-mentioned primary winding and operative to vary the degree of unbalance of the transverse field.

7. An asynchronous induction machine comprising stator and rotor elements with a primary winding and a secondary winding thereon, the end connections of said windings being so arranged as to produce an asymmetrical transverse magnetic field, and an additional primary winding with the polar axis of the field produced by its end connections displaced relatively to that of the first-mentioned primary winding, and means for controlling the energization of the additional winding.

In witness whereof, I have hereunto signed my name.

VITTORIO MARTINETTO.